(12) United States Patent
Fretwell

(10) Patent No.: US 9,562,625 B2
(45) Date of Patent: Feb. 7, 2017

(54) REPAIRING A WET BUCKLE IN A PIPELINE

(71) Applicant: International Pipeline Products Limited, Richmond, North Yorkshire (GB)

(72) Inventor: Peter Fretwell, Richmond (GB)

(73) Assignee: International Pipeline Products Limited, Richmond (GB)

(*) Notice: Subject to any disclaimer, the term of this patent is extended or adjusted under 35 U.S.C. 154(b) by 0 days.

(21) Appl. No.: 14/641,664

(22) Filed: Mar. 9, 2015

(65) Prior Publication Data

US 2016/0091115 A1    Mar. 31, 2016

(30) Foreign Application Priority Data

Sep. 26, 2014   (GB) .................................. 1417070.8

(51) Int. Cl.
*F16L 1/26* (2006.01)
*F16L 55/18* (2006.01)
*F16L 55/46* (2006.01)
*F16L 1/19* (2006.01)
*F16L 101/12* (2006.01)

(52) U.S. Cl.
CPC ................. F16L 1/26 (2013.01); F16L 55/18 (2013.01); F16L 55/46 (2013.01); F16L 1/19 (2013.01); F16L 2101/12 (2013.01)

(58) Field of Classification Search
CPC .............. F16L 1/26; F16L 55/26; F16L 55/46; F16L 2101/12
See application file for complete search history.

(56) References Cited

U.S. PATENT DOCUMENTS

| 3,578,233 | A | * | 5/1971 | Meister | ..................... F16L 1/26 228/107 |
| 3,751,932 | A | * | 8/1973 | Matthews, Jr. | ......... F16L 1/166 137/15.07 |
| 3,788,084 | A | * | 1/1974 | Matthews, Jr. | ......... E21B 23/10 15/104.061 |
| 4,155,373 | A | | 5/1979 | DiGiovanni | |

(Continued)

FOREIGN PATENT DOCUMENTS

| FR | 2670558 A1 | 12/1990 |
| GB | 1320885 A | 6/1973 |

(Continued)

*Primary Examiner* — Frederick L Lagman
(74) *Attorney, Agent, or Firm* — Stoel Rives LLP

(57) ABSTRACT

A method of repairing a length of pipeline which has experienced a wet buckle during deployment is disclosed. The method includes: severing the pipeline at locations which are spaced apart on opposite sides of a buckle and removing the buckled section to leave spaced severed ends; locating a pipeline pig in a pig deployment device; releasably coupling a pig insertion member of the pig deployment device to the pig; releasably coupling the pig deployment device to one of the severed ends; operating the pig deployment device to cause the pig insertion member to translate the pig out of the deployment device and into the pipeline through said severed end; releasing the pig insertion member from the pig and retracting the pig insertion member, leaving the pig in place within the pipeline; releasing the pig deployment device from said severed end; and welding the severed ends together.

30 Claims, 11 Drawing Sheets

(56) References Cited

U.S. PATENT DOCUMENTS

| | | | | |
|---|---|---|---|---|
| 4,155,669 | A | * | 5/1979 | Rochelle ............... F16L 1/26 |
| | | | | 405/158 |
| 4,422,477 | A | * | 12/1983 | Wittman ............ F16L 55/1283 |
| | | | | 138/89 |
| 4,572,549 | A | | 2/1986 | Sidwell |
| 5,044,827 | A | * | 9/1991 | Gray ..................... F16L 1/166 |
| | | | | 405/158 |
| 5,186,757 | A | * | 2/1993 | Abney, Sr. ............. F16L 55/46 |
| | | | | 134/22.11 |
| 5,208,937 | A | * | 5/1993 | Cooper .................. B08B 9/055 |
| | | | | 134/8 |
| 5,439,032 | A | | 8/1995 | Petrone |
| 6,241,424 | B1 | * | 6/2001 | Bath ........................ F16L 1/26 |
| | | | | 15/104.061 |
| 6,428,241 | B1 | * | 8/2002 | Stracke .................. B08B 9/055 |
| | | | | 405/184.1 |
| 6,925,671 | B1 | * | 8/2005 | Mouton ................. B08B 9/055 |
| | | | | 137/268 |
| 2002/0059687 | A1 | * | 5/2002 | Smith .................... B08B 9/055 |
| | | | | 15/104.062 |
| 2011/0174387 | A1 | * | 7/2011 | Olivier ................. B66F 7/0625 |
| | | | | 137/15.07 |
| 2013/0111680 | A1 | * | 5/2013 | Archer ................... F16L 55/46 |
| | | | | 15/104.062 |
| 2014/0234029 | A1 | | 8/2014 | Sweeney |

FOREIGN PATENT DOCUMENTS

| | | | | |
|---|---|---|---|---|
| GB | 2015119 | A | | 9/1979 |
| GB | 2459325 | A | * | 10/2009 .......... B23K 9/0061 |
| GB | 2470997 | B | | 5/2014 |
| WO | 2005028942 | A1 | | 3/2005 |

* cited by examiner

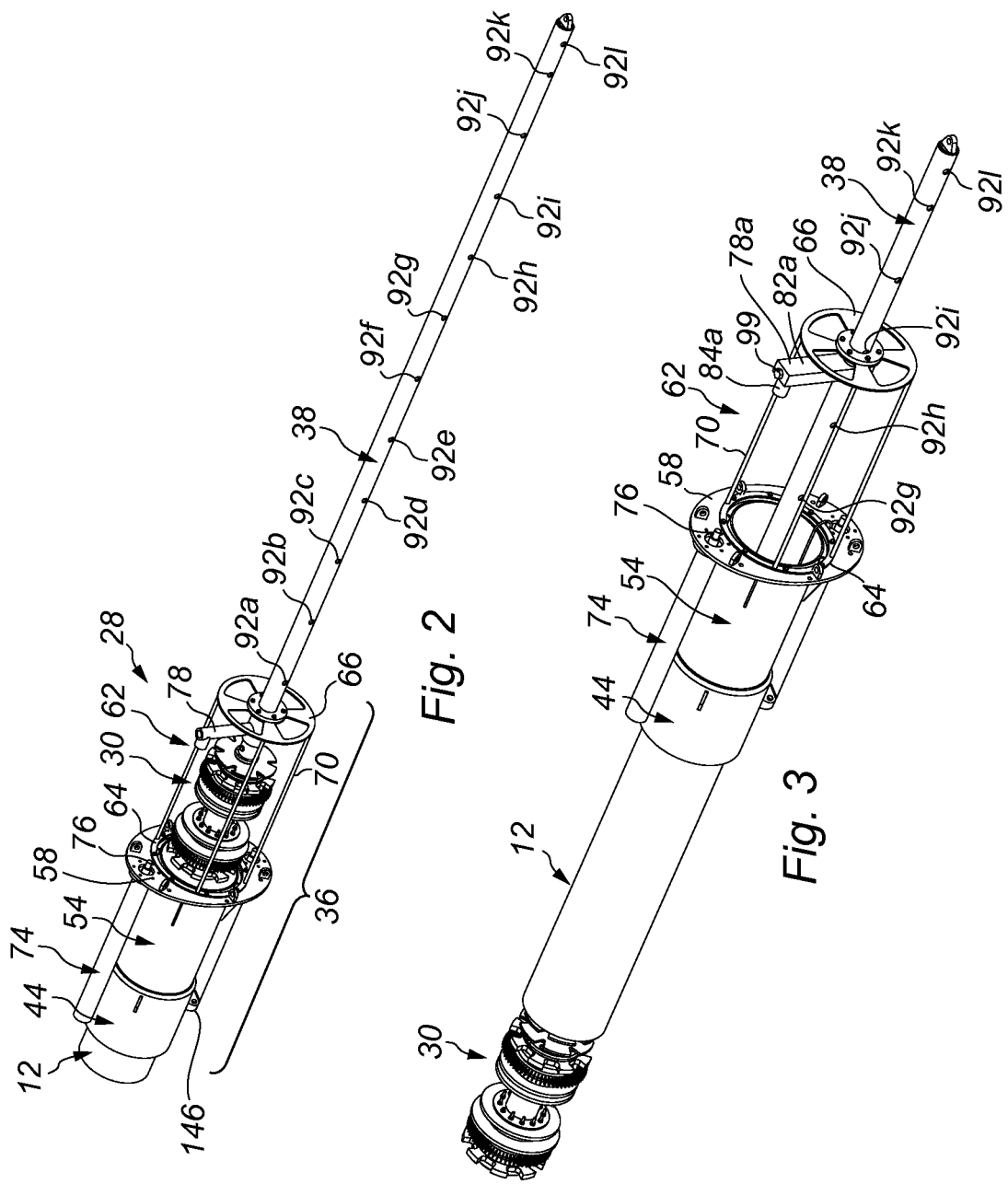

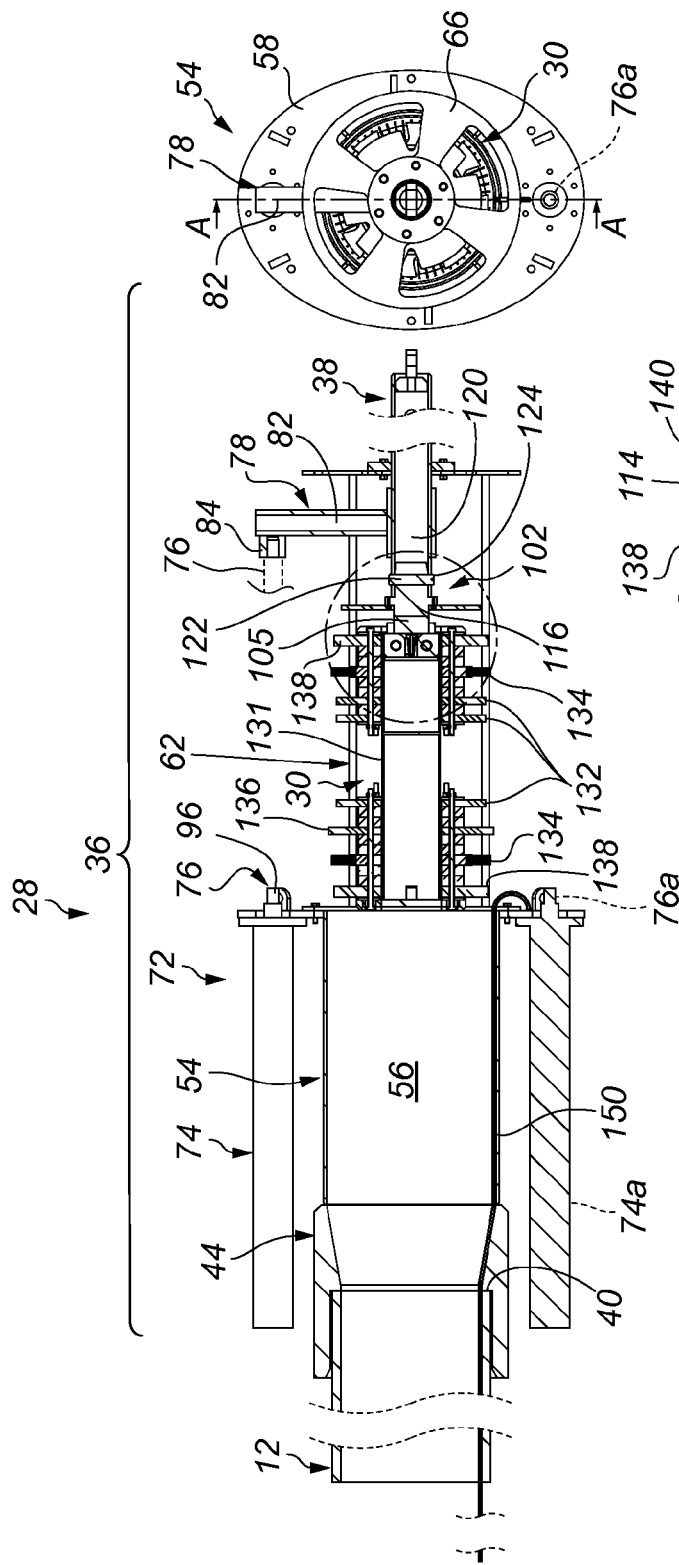

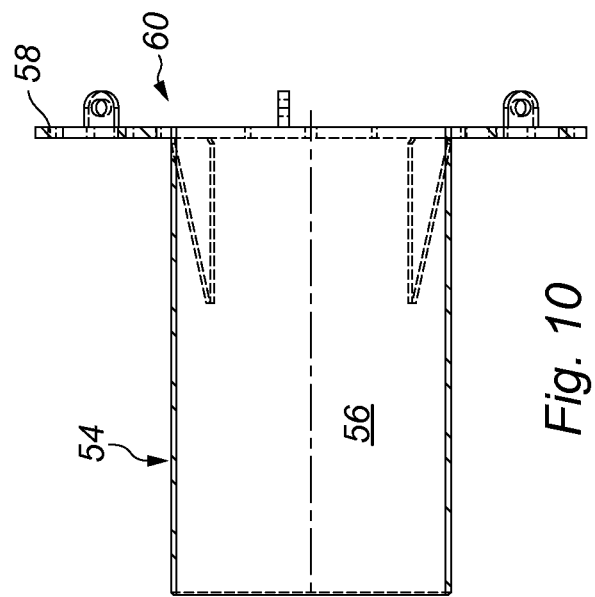
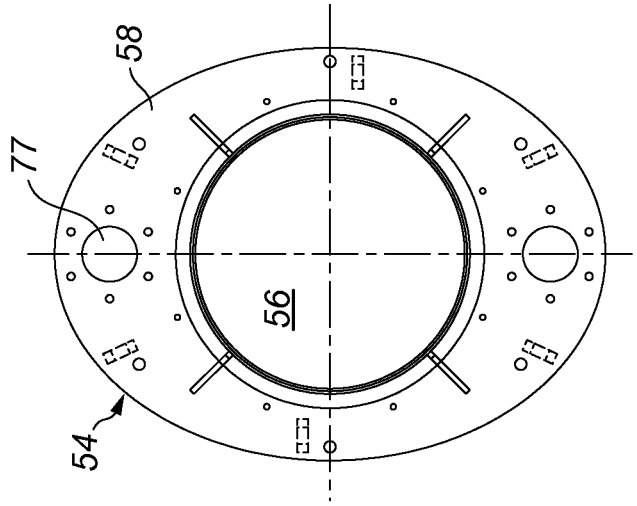
Fig. 10
Fig. 11

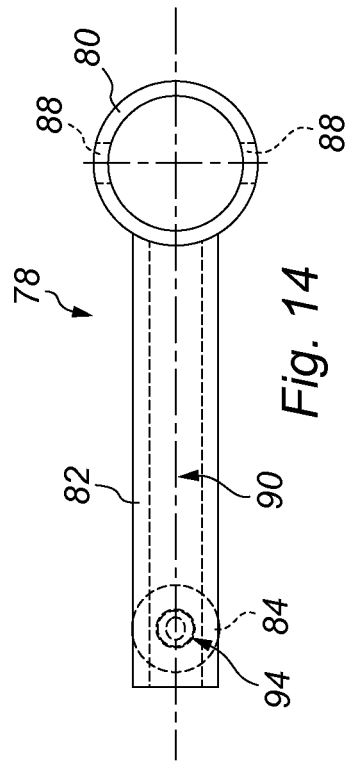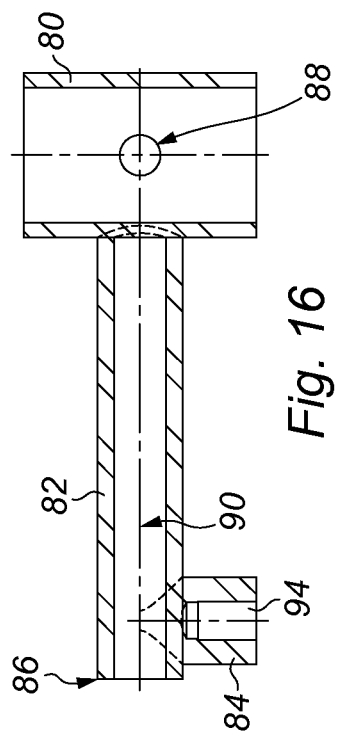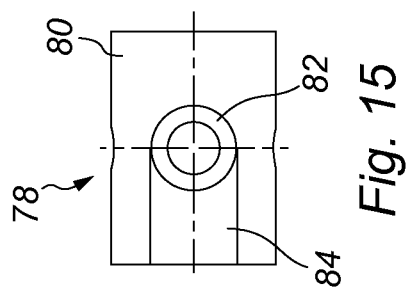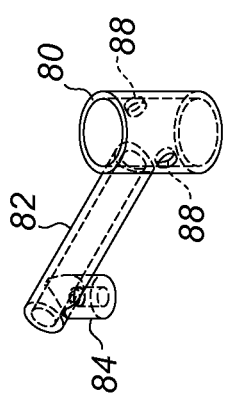

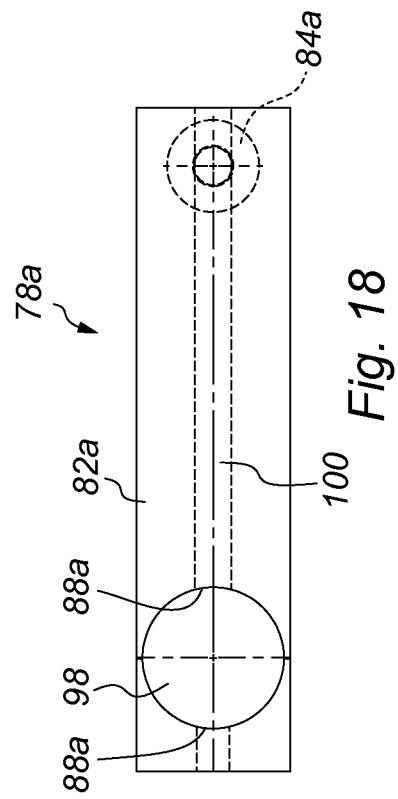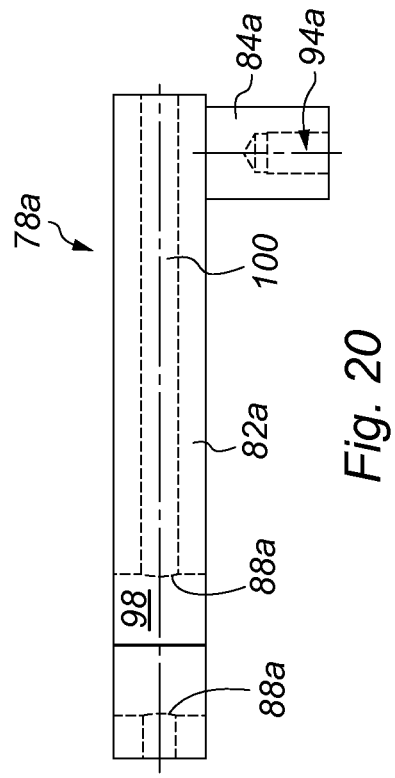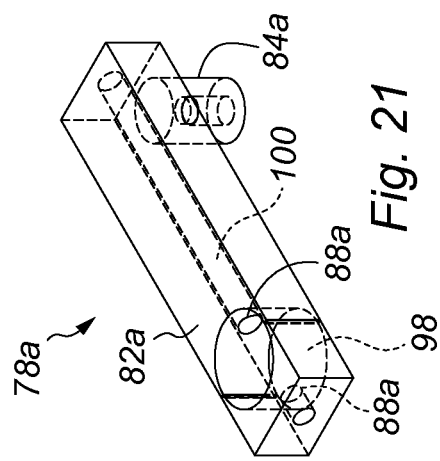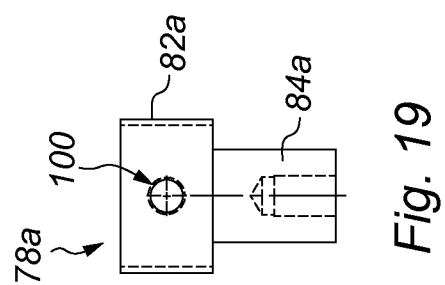

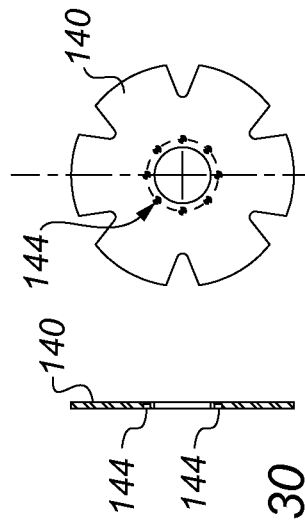
Fig. 29
Fig. 30
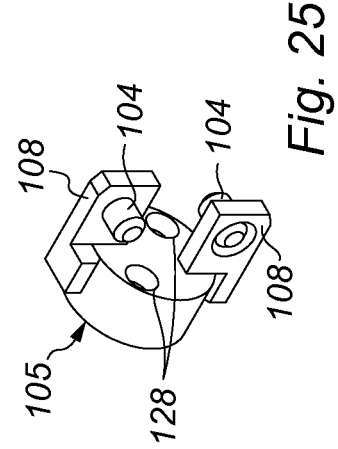
Fig. 25
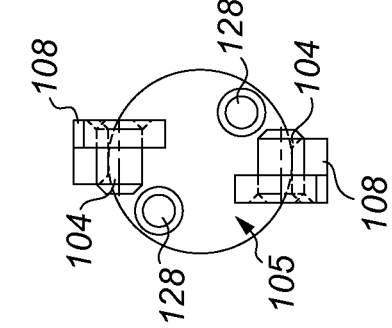
Fig. 23
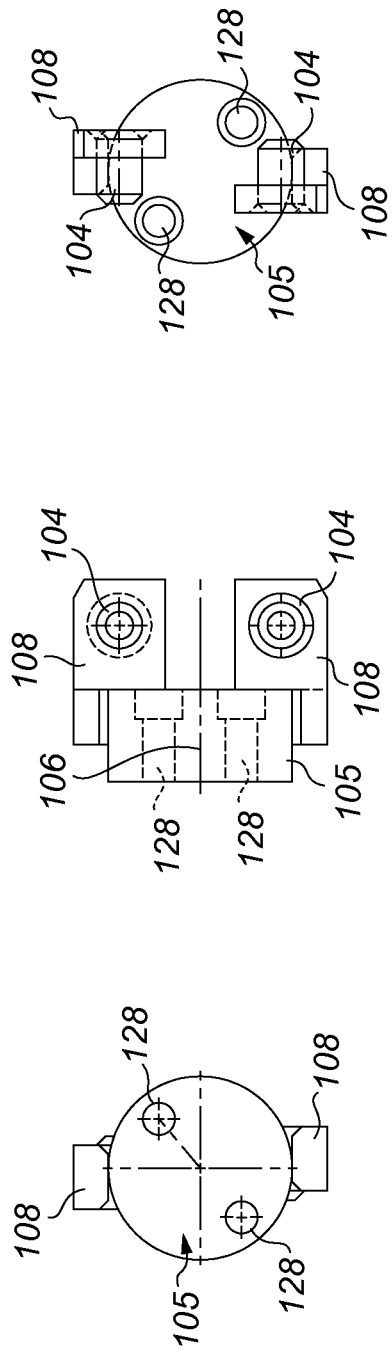
Fig. 22
Fig. 24

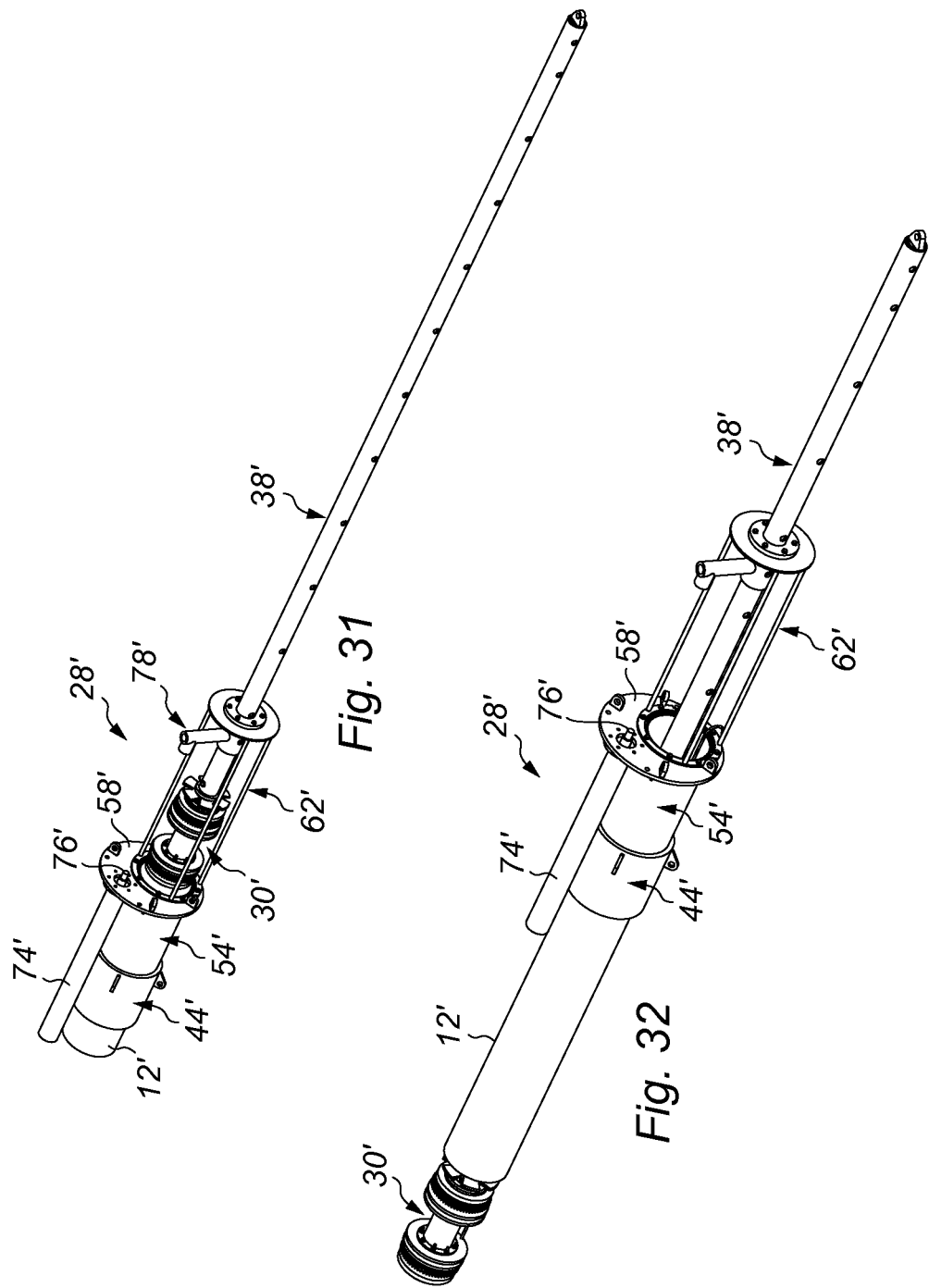

REPAIRING A WET BUCKLE IN A PIPELINE

RELATED APPLICATIONS

This application claims priority to Great Britain Application No. 1417070.8, filed Sep. 26, 2014, which is hereby incorporated by reference herein in its entirety.

TECHNICAL FIELD

The present invention relates to a method of repairing a pipeline which has experienced a wet buckle during deployment from a pipelaying vessel towards a seabed, and to associated apparatus. In particular, but not exclusively, the present invention relates to a method of repairing a pipeline which has experienced a wet buckle during deployment, in which the buckled section of pipeline is removed and a pipeline pig is employed to remove contaminants from the pipeline resulting from the severing process.

BACKGROUND

In the oil and gas exploration and production industry, many oil and gas deposits are found in offshore locations. This presents significant challenges, not least of which is the transportation of large volumes of oil and/or gas back onshore. One way in which this is achieved is by laying a pipeline from the offshore location back to an onshore installation. This usually involves laying a pipeline on the seabed, extending from a production and/or storage facility in the offshore location, back onshore. This is, however, an extremely costly and time-consuming procedure.

Advanced pipelaying techniques have therefore been developed which have sought to reduce both the time and cost involved in laying pipelines of this type. These techniques involve manufacturing a length of pipeline of the order of several hundred or evens thousands of meters in length onshore, and then deploying the length of pipeline on to a large diameter reel, which is supported on a dedicated pipelaying vessel. The reeled length of pipeline is then transported offshore and deployed from the reel on the vessel and on to the seabed. The vessel progresses in a forward direction as the length of pipeline is slowly deployed overboard. A number of such reeled lengths of pipeline may be required in order to form the complete pipeline, which may be several thousand meters in length, the successive reeled lengths of pipeline being welded together end-to-end.

Many different techniques have been developed for deploying the pipeline from the vessel, including 'S-lay' and 'J-lay' techniques, which are well known in the industry. The primary differences between the various techniques are the particular way in which the length of pipeline is stored on the vessel, and the way in which a free end of the pipeline is deployed from the vessel and down towards the seabed.

In each case however, the length of pipeline is deployed from the vessel into open water, and flooded with seawater so as to negate buoyancy effects. The length of pipeline experiences significant stresses as it travels down to the seabed. In particular, it experiences significant bending stresses as it is curved to transition from the angle at which it is deployed from the vessel, to that which it adopts when it is laid on the seabed. In this regard, it will be noted that some pipelines, depending on their purpose and the materials from which they are constructed, can be arranged so that they are raised up from the seabed in certain areas, for example in a 'lazy-wave', which allows for heave of a floating production/storage vessel to which the pipeline is connected.

A particular problem which can be encountered during deployment of the length of pipeline is a situation known as a 'wet buckle'. This is where the pipeline buckles during deployment from the vessel, at a location which is below sea-level. The buckle typically occurs in a region of the pipeline which is undergoing significant curvature, and so consequent stress. When a wet buckle occurs, it is necessary to stop forward motion of the pipelaying vessel, before 'backing-up' the vessel and reeling the pipeline back on to the reel. This process continues until the buckle has been brought back to the level of the vessel deck. The pipeline is then securely gripped above and below the buckle, cuts made either side of the buckle, and the buckled portion removed. The cut ends of the pipeline are then subjected to a suitable preparatory procedure and welded together. Pipelaying can then recommence.

In theory this is a simple procedure, but in practice it presents numerous technical challenges, and also hampers subsequent completion of the pipeline.

In particular, as mentioned above, the pipeline is flooded with seawater during deployment. Depending upon water depth, it may not be possible to raise the buckle back up to the vessel, for the simple reason that the self-weight of the pipeline containing the water is too great for equipment on the vessel, and potentially the vessel itself, to support.

More significantly, it is very important that the inside of the pipeline does not become contaminated during the procedure to cut out the buckled section of pipeline, for example with abrasive metal cuttings. A particular reason for this is that most metal pipelines are of a simple low-cost carbon steel, with a thin inner liner of an expensive corrosion resistant material (such as 316 or 317 stainless steel). Metal cuttings within the pipeline could lead to a deterioration of the liner and consequent corrosion of the carbon steel, with potentially disastrous consequences. It is therefore necessary to provide a barrier within the pipeline before commencing the cutting procedure.

All pipelines which are deployed following the above techniques include a 'laydown head' at their free end, which carries a number of specialist pipe inspection/cleaning devices known as 'pipeline pigs'. The pigs can be translated along the pipeline, their primary purpose being performance of pressure testing/inspection of the completed pipeline. A number of such pigs are provided in the laydown head, and are separately deployable so that numerous such procedures can be carried out.

When a wet buckle occurs, it is necessary to release a pig from the laydown head, and to pump it along the pipeline to a position which is adjacent the buckle. In shallow water, the pig can be pumped along the pipeline using seawater, but in deep water locations, it is necessary to pump the pig along the pipeline using air, due to the self-weight issues discussed above. This brings about its own problems because it can result in the pipeline becoming buoyant and lifting off the seabed.

Once the pig has been positioned adjacent the buckle, the pipeline can be drawn back up to the vessel, and the buckled portion cut out, as described above. The pig can then be pumped up and out of the pipeline, carrying any contamination such as metal cuttings. The primary problems with this are as follows.

Firstly, it is time-consuming to pump the pig along the pipeline from the laydown head, which may amount to a distance of many kilometers. The entire procedure can take of the order of 14 days to complete. This represents a significant delay in the context of completing the pipeline laying procedure.

Secondly, the procedure can be extremely expensive. This is because pipelaying is delayed, and the specialist pipelaying vessels are hired out at rates of the order of hundreds of thousands of US dollars per day, which are wasted when the vessel is not being employed in pipelaying. Also, in deepwater locations where air must be charged into the pipeline to pump the pig along the pipe, this requires a further specialist vessel which is capable of pumping large volumes of air hundreds of meters below sea level to the laydown head, and also often requires deployment of an ROV to connect supply hoses and actuate the pig. Such equipment is again hired out at significant day rates.

Thirdly, the procedure effectively uses up one of the pipeline pigs which has been positioned in the laydown head prior to deployment of the pipeline from the vessel. This can hamper test/inspection procedures to be carried out at a later date, particularly if more than one wet buckle occurs.

SUMMARY

It is amongst the objects of embodiments of the present invention to obviate or mitigate at least one of the foregoing disadvantages.

According to a first aspect of the present invention, there is provided a method of repairing a length of pipeline which has experienced a wet buckle during deployment from a pipelaying vessel towards a seabed, the method comprising the steps of: severing the pipeline at locations which are spaced apart on opposite sides of a buckle and removing the buckled section to leave spaced first and second severed ends; locating a pipeline pig in a pig deployment device; releasably coupling a pig insertion member of the pig deployment device to the pig; releasably coupling the pig deployment device to one of the severed ends; operating the pig deployment device to cause the pig insertion member to translate the pig out of the deployment device and into the pipeline through said severed end; releasing the pig insertion member from the pig and retracting the pig insertion member, leaving the pig in place within the pipeline; releasing the pig deployment device from said severed end; welding the severed ends together; and then applying fluid pressure to the pig to translate the pig along the pipeline towards an end of the pipeline which is located distally from the vessel, to remove contaminants within the pipeline resulting from the severing process.

The method of the present of the present invention provides numerous advantages over prior methods. In particular, the method involves inserting the pipeline pig into the pipeline through one of the severed ends. The pig can therefore be inserted relatively quickly, thereby avoiding a requirement to translate a pig along a full length of the pipeline from a laydown head, with consequent savings in time and cost. Furthermore, the method avoids a requirement to use a pipeline pig which has been located in a laydown head with a primary purpose of performing testing/inspection following completion of the pipeline. The pipeline pig which is inserted in the method of the present invention is a dedicated pig involved in the repair of the wet buckle.

Reference is made herein to the removal of contaminants within the pipeline resulting from the severing process. Such contaminants will primarily comprise small particles of material forming a wall of the pipeline generated during the severing process. For example, the step of severing the pipeline may involve a process of material removal such as cutting or abrading (mechanically or thermally), which generates large volumes of metal cuttings of small dimension.

Reference is made herein to deployment of a pipeline from a pipelaying vessel towards a seabed. It will be understood that the reference to a seabed should be taken to be a submerged surface of land in a body of water where the pipeline is being deployed, which body of water may be selected from the group comprising: a sea, ocean, river and lake (and which may comprise fresh and/or salt water).

Reference is made herein to a wet buckle. It will be understood from the introduction of the present application that a wet buckle is a buckle in the pipeline which has occurred at a location which is below the surface level of a body of water into which the length of pipeline has been deployed.

The pipeline is severed at locations which are spaced apart on opposite sides of the buckle. It will be understood that such references should be taken considering the pipeline in its normal, deployed orientation, and so irrespective of the orientation of the pipeline on the vessel and/or during deployment from the vessel. The pipeline may be severed at locations which are spaced apart along a length of the pipeline, so that the cuts effectively straddle the buckle.

The pipeline pig may comprise at least one wiping seal element, arranged to provide a wiping seal with an internal wall of the pipeline. Typically a plurality of such wiping seals are provided. The wiping seal provides the ability to generate a pressure differential between opposed surfaces of the wiping seal element, so that the pig can be translated along the pipeline by applied fluid pressure. The pig may also comprise one or more of the following: at least one cleaning element for cleaning the internal wall of the pipeline; a flower petal disc; and a seal cup.

The step of severing the pipeline may comprise separating the length of pipeline into a first portion which extends from the vessel into the water and has a first severed end, and a second portion which is contained on the vessel and has a second severed end.

The step of releasably coupling the pig deployment device to said severed end may comprise releasably coupling the device to the severed end of the length of pipeline extending from the vessel into the water. The method may further comprise translating the pig to a location which is below a level of water contained within the pipeline. The pig is typically arranged to provide a wiping seal with a wall of the pipeline, and the method may comprise expelling air and/or other gases contained between the pig and the surface of water in the pipeline during insertion of the pig. This may be achieved by inserting an elongate breather element into the pipeline adjacent the wall of the pipeline so that, when the pig is inserted into the pipeline, the breather element is located between the wall of the pipeline and the pig. This may provide a pathway for the passage of air past the pig, in particular past a wiping seal element of the pig. The elongate breather element may be located so that it extends along the pipeline from the severed end and into the water in the pipeline. Typically, an end of the breather element is positioned below the surface level of water in the pipeline. This may help to ensure that all or substantially all air (and/or other gases) are expelled. The elongate breather element may be solid and may for example be a rod, or may be hollow and may for example be a tube such as a pipe. Advantageously, the elongate breather element is provided of a material having a relatively low coefficient of friction, suitably a plastics material such as polytetrafluoroethylene (PTFE).

The method may comprise the further steps of: deploying the repaired (welded) length of pipeline towards the seabed carrying the pig; arranging the portion of pipeline carrying the pig in a desired deployed position; and then performing the step of translating the pig along the pipeline.

The method may comprise performing the step of translating the pig along the pipeline, and then: deploying the repaired (welded) length of pipeline towards the seabed carrying the pig; and then arranging the portion of pipeline carrying the pig in a desired deployed position.

The step of arranging the portion of pipeline in a desired deployed position may comprise laying at least part of the portion of pipeline carrying the pig on the seabed. At least part of said portion may be raised up from the seabed.

The step of applying fluid pressure may comprise pumping water into the pipeline behind the pig. Reference to pumping water in 'behind' the pig should be understood to be taken in the context of the pig being translated in a direction towards a distal end of the pipeline. The pig may be translated along the pipeline to a pig catcher, which may be provided in a laydown head at a distal end of the pipeline. The method may comprise flushing out the pig catcher to remove contaminants transported into the pig catcher by the pig. The method may comprise removing the pig from the pig catcher so that a further pig can be caught in a subsequent operation, for example in the event of a subsequent wet buckle occurring. The method may comprise providing a plurality of pig catchers, each serving for catching a respective pig.

The step of releasably coupling the pig deployment device to one of the severed ends may comprise coupling an interface member of the device to said end, the interface member being shaped to receive said end. The interface member may be generally annular in shape.

The step of operating the pig deployment device may comprise translating the pig from a housing defining a pig loading chamber into the pipeline. The housing may be coupled to the interface member. The housing may have a bore defining the pig loading chamber, and the bore may be of a diameter which is greater than a maximum external diameter of the pig. This may facilitate insertion of the pig into the pipeline. The interface member may have a portion which is coupled to said end of the pipeline, and which has a diameter matching an inner diameter of the pipeline. The interface member may have a tapered portion which provides a transition from a diameter of the housing bore to the diameter of the portion which is coupled to said end of the pipeline. The interface member may define an abutment surface, such as on a radially extending shoulder, and the method may comprise seating said end of the pipeline against the abutment surface. In this way, the interface member, and so the pig deployment device, may be supported on said end of the pipeline. The method may comprise exerting a restraining force on the pig deployment device, in particular the interface member, to retain the device on said end of the pipeline.

The step of operating the pig deployment device may comprise operating a drive arrangement of the device to translate the pig insertion member relative to the pipeline and so insert the pig. The method may comprise the steps of: a) locating the drive arrangement in a starting position; b) releasably coupling the drive arrangement to the pig insertion member; c) operating the drive arrangement to move from its starting position towards a finishing position, during which movement the pig insertion member is translated a determined axial distance by the drive arrangement in a direction towards the pipeline; d) releasing the drive arrangement from the pig insertion member; and e) returning the drive arrangement to the starting position.

The method may comprise repeating steps b) to e) as necessary in order to translate the pig insertion member a desired distance relative to the pipeline, and so to locate the pig at a desired position within the pipeline. Advantageously, this may avoid a requirement to provide a drive arrangement which would need to move the entire insertion distance in a single movement; effectively, the pig insertion member (and so the pig) can be progressively inserted into the pipeline in a series of smaller, defined axial movements.

The method may comprise releasably coupling the drive arrangement to the pig insertion member, such as via a releasable joint. The drive arrangement may be hydraulically operated and may comprise at least one piston/cylinder device for controlling movement of the pig insertion member. The drive arrangement, in particular a piston of the drive arrangement, may be coupled to the pig insertion member by a connection element, the connection element forming the releasable joint. The pig insertion member may comprise a plurality of apertures through which a locating pin of the connecting element can be inserted to couple the drive arrangement to the pig insertion member.

The method may comprise coupling the pig insertion member to the pig via a releasable connection. The releasable connection may be a threaded connection. The releasable connection may comprise a bayonet-type fitting having one or more locating pins provided on one of the pig and the pig insertion member, and which mate with a corresponding locating aperture in the other one of the pig and the pig insertion member. The pins and apertures may be engaged and disengaged by rotary motion of the pig insertion member relative to the pig, in opposite directions.

The method may comprise positioning the pig in a support which has a generally open structure which supports and guides the pig insertion member. The generally open structure of the support may facilitate coupling of the pig insertion member to the pig, and may facilitate maintenance procedures on the pig. The support may be coupled to the housing defining the pig loading chamber.

According to a second aspect of the present invention, there is provided apparatus for use in repairing a pipeline which has experienced a wet buckle during deployment from a pipelaying vessel towards a seabed, the pipeline having been severed at locations which are spaced apart on opposite sides of the buckle and the buckled section removed to leave spaced first and second severed ends, the apparatus comprising: a pipeline pig; and a pig deployment device for inserting the pig into the pipeline, the pig being located in the pig deployment device and the pig deployment device comprising a pig insertion member which is releasably coupled to the pig; in which: the pig deployment device can be releasably coupled to one of the severed ends and the pig deployment device operated to cause the pig insertion member to translate the pig out of the deployment device and into the pipeline through said severed end; and the pig insertion member can subsequently be released from the pig and retracted leaving the pig in place within the pipeline, and the pig deployment device released from said severed end; so that the severed ends can be welded together and fluid pressure applied to the pig to translate the pig along the pipeline towards an end of the pipeline which is located distally from the vessel, to remove contaminants within the pipeline resulting from the severing process.

Further features of the apparatus may be derived from the text set out above relating to the method of the first aspect of the invention.

According to a third aspect of the present invention, there is provided a pig deployment device comprising: a housing defining a pig loading chamber of a first diameter; an interface member coupled to the housing, the interface member adapted to be mounted on an end of a length of pipeline and defining a bore of a second diameter which is smaller than said first diameter and which matches a diameter of a bore of the pipeline; and a pig insertion member which can be coupled to the pig; in which the pig deployment device is operable to cause the pig insertion member to translate the pig out of the pig loading chamber, through the interface member and into the pipeline through said severed end; and in which the pig insertion member is releasable from the pig so that the pig insertion member can be subsequently retracted leaving the pig in place within the pipeline.

Further features of the pig deployment device may be derived from the text set out above relating to the method of the first aspect of the invention.

BRIEF DESCRIPTION OF THE DRAWINGS

FIG. 2 is a perspective view of apparatus for use in repairing a pipeline which has experienced a wet buckle during deployment from a pipelaying vessel towards a seabed, in accordance with an embodiment of the present invention;

FIG. 3 is a view similar to FIG. 2, showing the apparatus at a stage during insertion of a pig of the apparatus into the length of pipeline;

FIGS. 4 and 5 are enlarged longitudinal cross-sectional and end views, respectively, of the apparatus shown in FIGS. 2 and 3;

FIG. 6 is a further enlarged detail view of the area A of the apparatus shown in FIG. 4;

FIGS. 10 and 11 are enlarged longitudinal cross-sectional and end views, respectively, of a pig housing of the pig deployment device;

FIGS. 14, 15 and 16 are enlarged plan, end and longitudinal sectional views, respectively, of a releasable joint between the pig insertion member and a drive arrangement of the apparatus;

FIG. 17 is a perspective view of the releasable joint of FIGS. 14 to 16, drawn to a different scale;

FIGS. 18, 19 and 20 are enlarged plan, end and side views, respectively of an alternative releasable joint between the pig insertion member and the drive arrangement of the apparatus;

FIG. 21 is a perspective view of the releasable joint of FIGS. 18 to 20, drawn to a different scale;

FIGS. 22, 23, 24 and 25 are enlarged side, end, rear and perspective views, respectively, of part of a releasable connection between the pig insertion device and the pig;

FIGS. 29 and 30 (on same sheet as FIG. 22) are end and cross-sectional side views, respectively of a petal spacer on the pig insertion member;

FIG. 31 is a perspective view of apparatus for use in repairing a pipeline which has experienced a wet buckle during deployment from a pipelaying vessel towards a seabed in accordance with an alternative embodiment of the present invention; and FIG. 32 is a view similar to FIG. 31, showing the apparatus at a stage during insertion of the pig into the length of pipeline.

DETAILED DESCRIPTION OF PREFERRED EMBODIMENTS

Figure 1:
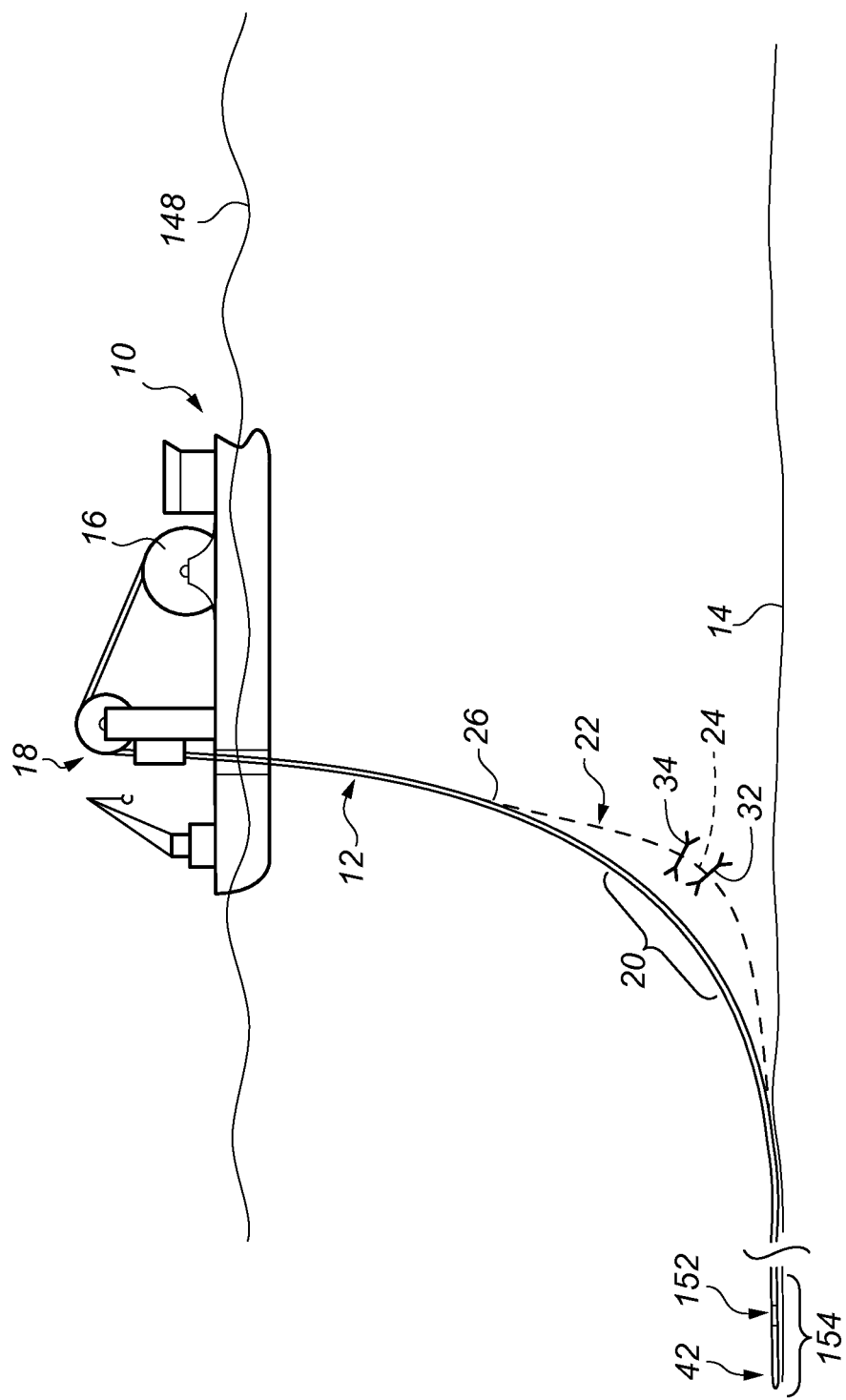
FIG. 1 is a schematic side view of a pipelaying vessel shown during the laying of a length of pipeline onto a seabed in an offshore location.

Turning firstly to FIG. 1, there is shown a schematic side view of a pipelaying vessel 10 shown during the laying of a length of pipeline 12 onto a seabed 14 in an offshore location. As explained above, the offshore location may be in a sea or ocean, but could potentially be in a body of fresh water such as a lake, or in a river. References to a seabed should be interpreted accordingly.

As is well known in the industry, the pipelaying vessel 10 carries the length of pipeline 12 on a large diameter reel 16, the length of pipeline having been manufactured and wound onto the reel at an onshore facility. The length of pipeline 12 is deployed from the reel 16 towards pipe straightening and deployment equipment 18, which serves for straightening the length of pipeline 12, to account for curvature which has occurred during deployment onto the reel 16. The length of pipeline 12 is then deployed overboard from the vessel 10 towards the seabed 14, in this case in a 'J-lay' method, although it will be understood that numerous alternative methods may be employed, including 'S-lay'. Numerous such lengths of pipeline 12, which may be many hundreds or indeed thousands of meters in length, may be required to form the completed pipeline, the lengths of pipeline being carried on respective reels and ends of the lengths of pipeline welded together as required.

During deployment of the length of pipeline 12 from the vessel 10 to the seabed 14, a zone 20 is subjected to significant curvature, and so high stress. This can result in the pipeline experiencing a wet buckle. This is illustrated schematically by the broken line 22, which shows the profile that the length of pipeline 12 adopts when a wet buckle has occurred.

The wet buckle is indicated at 24, and has resulted in a wall 26 of the length of pipeline collapsing, so that the pipe becomes crushed. A remediation procedure must be carried out to remove the wet buckle 24 before further pipelaying can occur.

Turning now to FIG. 2, there is shown a perspective view of apparatus for use in repairing a pipeline which has experienced a wet buckle during deployment from a pipelaying vessel (such as the vessel 10) towards a seabed (such as the seabed 14).

The apparatus, and a method of repairing such a pipeline, will be described herein. The apparatus is indicated generally by reference numeral 28, and is shown in FIG. 2 prior to commencement of insertion of a pipeline pig into the length of pipeline 12. FIG. 3 is a view similar to FIG. 2, but showing the apparatus 28 at a stage during insertion of a pipeline pig 30 of the apparatus into the length of pipeline 12. The apparatus 28 is shown in more detail in the enlarged longitudinal cross-sectional view of FIG. 4, the end view of FIG. 5 and the enlarged view of the detail area A shown in FIG. 6. In FIG. 4, the apparatus 28 is viewed in the direction of the arrow A-A in FIG. 5.

The method of the present invention generally comprises the following steps. The length of pipeline 12 which has experienced a wet buckle 24 is severed at locations 32 and 34 (FIG. 1), which are spaced apart on opposite sides of the buckle. These locations are thus spaced apart along a length of the length of pipeline straddling the buckle 24. Typically this procedure will be carried out on the vessel 10, by backing-up the vessel, reeling the length of pipeline 12 back onto the reel 16, and supporting the pipeline above and below the locations 32 and 34 where the pipe is to be severed. However, if suitable or required, the severing process may be carried out in a subsea location, such as with the assistance of an ROV (not shown). A section remaining on the seabed 14 would then be recovered to the vessel 10, whilst the section extending from the reel 16 would be reeled back in.

The length of pipeline 12 is severed at the locations 32 and 34 employing any suitable severing process, such as a mechanical or thermal cutting process, leaving spaced first and second severed ends. A first such severed end is shown in FIG. 4 and given the reference numeral 40. The pipeline pig 30 is located in a pig deployment device 36 of the apparatus 28, and a pig insertion member 38 of the device 36 is releasably coupled to the pig.

The pig deployment device 36 is releasably coupled to the severed end 40, which suitably is an end on a portion of the length of pipeline 12 extending from the vessel 10 towards the seabed 14. However, it will be understood from the following description that the severed end may be provided on a portion of the length of pipeline 12 on the vessel, extending from the reel 16.

Following coupling to the severed end 40, the pig deployment device 36 is operated to cause the pig insertion member 38 to translate the pig 30 out of the deployment device and into the length of pipeline 12, through the severed end 40. The pig 30 is translated along the length of pipeline 12 to a desired location, and the pig insertion member 38 is then released from the pig 30, leaving the pig in place within the pipeline. The pig insertion member 38 is then retracted. FIG. 2 shows the pig 30 prior to operation of the deployment device 36, whilst FIG. 3 shows the deployment device following operation, at a stage in translation of the pig insertion member 38 relative to the length of pipeline 12.

When the pig 30 has been located in the desired position and the pig insertion member retracted, the pig deployment device 36 is released from the severed end 40 of the length of pipeline 12. Fluid pressure can then be applied to the pig 30, in a fashion known in the art, to translate the pig along the pipeline towards an end 42 (FIG. 1) which is located distally from the vessel 10. In this way, contaminants within the length of pipeline 12 resulting from the severing process are removed from the pipeline by the pig 30.

Figure 9:
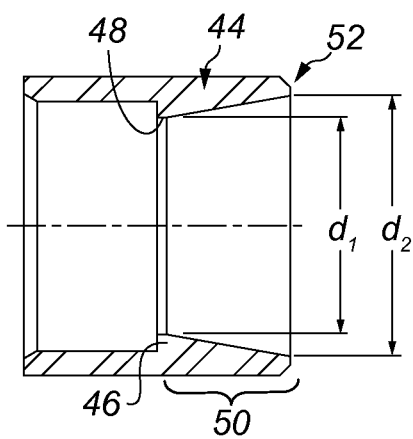
FIGS. 7, 8 and 9 are enlarged side, end and longitudinal cross-sectional views, respectively, of an interface member of a pig deployment device of the apparatus shown in FIGS. 2 and 3.
Figure 8:
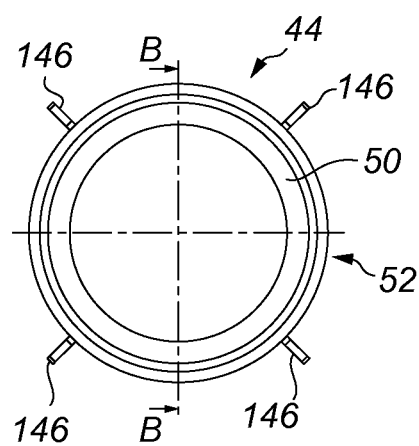
Figure 7:
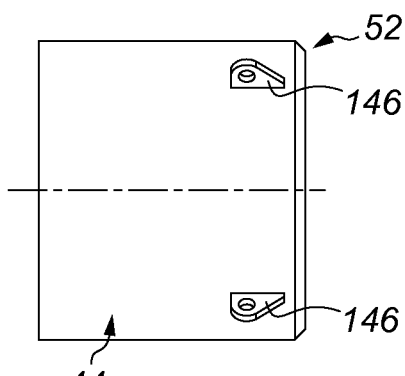

The method and apparatus 28 of the present invention will now be described in more detail. The pig deployment device 36 comprises an interface member in the form of a generally annular collar 44, which is shown in more detail in the enlarged side view of FIG. 7, the end view of FIG. 8, and the longitudinal cross-sectional view of FIG. 9 (taken in the direction of the arrows B-B of FIG. 8). The collar 44 is shaped to receive the severed end 40 of the length of pipeline 12, and to this end defines an abutment portion in the form of a radially extending shoulder 46. An inner surface 48 of the shoulder 46 describes an internal diameter $d_1$, which is equivalent to an internal diameter of the length of pipeline 12. The collar 44 also comprises a tapered portion 50 which defines a transition from a larger second diameter $d_2$ (which is described by an end 52 of the collar 44) to the diameter $d_1$, where the tapered portion 50 meets the shoulder 46. As will be described below, this facilitates insertion of the pipeline pig 30 into the length of pipeline 12.

The pig deployment device 36 also comprises a pig housing 54 which defines a pig loading chamber 56, the pig housing shown in more detail in the enlarged longitudinal sectional view of FIG. 10, and the end view of FIG. 11. The pig loading chamber 56 has an internal diameter $d_2$ which matches the maximum diameter of the tapered portion 50 of the collar 44, to provide a smooth transition for the pig 30 from the pig loading chamber 56 into the collar 44. The pig housing 54 is typically welded to the collar 44, but may be otherwise secured (such as via a flange and nut/bolt assemblies). The pig housing 54 carries an integral flange 58 at an end 60 which is spaced from the collar 44, and which serves for mounting a drive arrangement 72 of the apparatus 28 to the pig deployment device 36, as will be discussed below.

Figure 12:
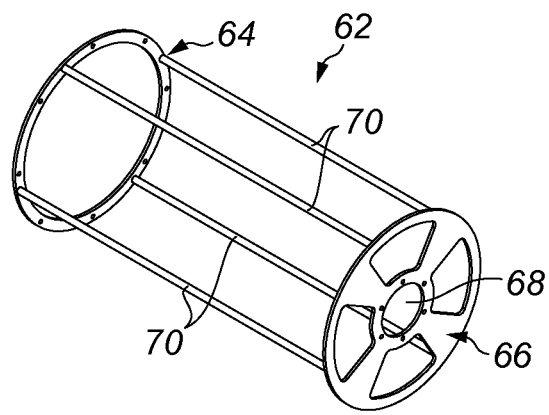
FIGS. 12 and 13 are enlarged perspective and end views, respectively, of a support for the pig and a pig insertion member of the pig insertion device.
Figure 13:
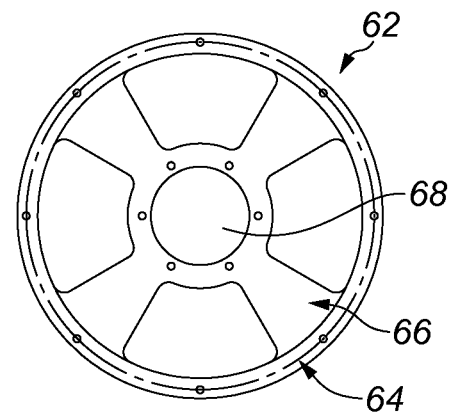

The pig insertion member 38 takes the form of a tubular ramrod which is releasably coupled to the pig 30. A support 62 of a generally open structure supports the ramrod 38, and facilitates coupling of the ramrod to the pig 30. The support 62 is shown in more detail in the enlarged perspective view of FIG. 12, and in the further enlarged end view of FIG. 13. The support 62 comprises a first flange 64 which is mounted on the flange 58 of the pig housing 54, and a second flange 66 which is spaced from the first flange 64, and which includes an aperture 68 that receives and guides the ramrod 38. The first and second flanges 64 and 66 are secured together by four coupling rods 70, which thereby form the relatively open structure, this facilitating access to the pig 30 for maintenance and coupling of the ramrod 38 to the pig 30.

The drive arrangement 72 comprises a hydraulic cylinder 74, in which a piston 76 is mounted for movement between a retracted position shown in solid outline in FIG. 4, and an extended position shown in broken outline. The drive arrangement serves for imparting a force on the ramrod 38 to translate the ramrod relative to the length of pipeline 12, for inserting the pig 30 into the pipeline. The cylinder 74 is secured to the housing flange 58 so that the piston 76 can extend through an aperture 77 in the flange, to connect to and drive the ramrod 38.

The apparatus 28 comprises a releasable connection for releasably coupling the drive arrangement 72, in particular the piston 76, to the ramrod 38. In the illustrated embodiment, two different examples of releasable connection are shown in FIGS. 2 and 3, and given the reference numerals 78 and 78a, respectively. Like components of the joint 78a with the joint 78 share the same reference numerals, with the addition of the suffix 'a'. The joint 78 is shown in more detail in the enlarged plan, end and longitudinal sectional views of FIGS. 14 to 16, as well as the perspective view of FIG. 17 (drawn to a different scale).

The joint 78 comprises a tubular collar 80 which receives and fits around the ramrod 38, a laterally extending arm 82, and a piston mounting 84 provided towards an end 86 of the arm 82. The collar 80 includes a pair of apertures 88 which are oriented across a diameter of the collar, perpendicular to a main axis 90 of the arm 82. The apertures 88 are arranged so that they can align with a series of corresponding pairs of apertures 92 provided in the ramrod 38, FIG. 2 showing 12 such pairs of apertures numbered 92a to 92l. A further such pair of apertures 92 is provided but is hidden by the joint collar 80. The piston mounting 84 includes a bore 94 which is typically threaded for receiving a corresponding threaded coupling 96 on an end of the piston 76, so that the piston can be secured to the arm 82, and thus to the ramrod 38. This is achieved by inserting a locating pin (not shown) through the pair of apertures 88 in the collar 80, when aligned with a corresponding one of the pairs of apertures 92 in the ramrod 38.

The alternative joint 78a is shown in the plan, end, side and perspective views of FIGS. 18 to 21, respectively. The joint 78 similarly comprises a laterally extending arm 82a and piston mounting 84a defining a threaded bore 94a for receiving the piston coupling 96. However, the joint 78a differs from the joint 78 of FIGS. 14 to 17 in that the arm 82a provides an integral mounting for the ramrod 38, in the form of a port 98. A bore 100 extends along a length of the arm 82a, and apertures 88a open onto the port 98. In this way, a locking bolt or pin 99 (FIG. 3) can be inserted along the bore 100 and through the ramrod 38, when a pair of the ramrod apertures 92 are aligned with the apertures 88a.

The ramrod 38 is releasably coupled to the pig 30 via a releasable connection 102, which is shown in the enlarged view of FIG. 6. In the illustrated embodiment, the releasable connection 102 takes the form of a bayonet type fitting which provides a rotation lock between the ramrod 38 and the pig 30. The connection 102 comprises a pair of locking pins 104, which are best shown in the enlarged side, end, rear and perspective views of FIGS. 22 to 25, respectively. The locking pins 104 are provided on a body 105 and are oriented transverse, in particular generally perpendicularly, to a main axis 106 of the body 105. The locking pins 104 take the form of prongs and extend from plates 108 mounted on the body 105, which defines a prong adapter. The prong adapter 105 can be rotated to engage and disengage the prongs 104 in corresponding apertures 110 provided in mounting plates 112 mounted within a recess 114 in an end of the pig 30.

Figure 27:
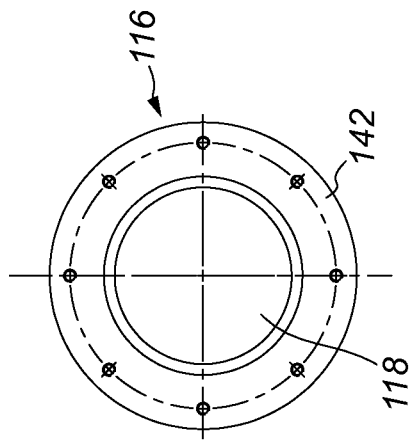
FIGS. 26, 27 and 28 are enlarged longitudinal sectional, end and rear views, respectively, of a further part of the releasable connection between the pig insertion device and the pig.
Figure 26:
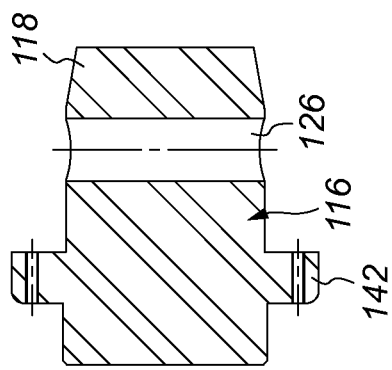
Figure 28:
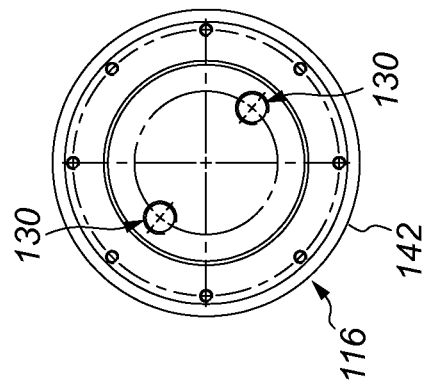

The adapter 105 is secured to the ramrod 38 via a body in the form of a nose fixing 116, which is shown in the enlarged longitudinal sectional, end and rear views of FIGS. 26 to 28, respectively. The nose fixing 116 has a tapered end 118 which is mounted within a bore 120 of the ramrod 38, and is secured by means of a locking pin 122 which extends through apertures 124 in the ramrod 38, and a bore 126 in the nose fixing 116. The prong adapter 105 is secured to the nose fixing 116 via bolts (not shown) which extend through apertures 128 in the prong adapter 105 into threaded bores 130 in the nose fixing 116. Typically the pig 30 will be located within the ramrod support 62, suspended from suitable hoisting equipment, and the prong adapter 105 brought to a position where the prongs 104 are in the same plane as the apertures 110 in the pig mounting plates 112. The pig 30 is then rotated to engage the prongs 104 in the apertures 110. Alternatively the ramrod 38 may be rotated to engage the prongs 104 in the apertures 110.

The pig 30 itself is of a type which is generally known in the industry, comprising a main body 131 on which a number of different elements are mounted. In the illustrated embodiment, three deformable annular wiping seal elements 132, annular cleaning brushes 134, larger diameter wiping seal element 136, and petals 138 are provided. A further petal 140 is provided separately from the pig 30, and is shown in the enlarged end and cross-sectional side views of FIGS. 29 and 30 (presented on the same sheet as FIG. 22). The petal 140 is secured to the ramrod 38, specifically to the nose fixing 116, via bolts (not shown) which extend through a flange 142 on the nose fixing into threaded bores 144 in the petal 140.

Operation of the apparatus 28 to insert the pig 30, and performance of the method of the present invention, will now be described. The apparatus 28 comprising the pig deployment device 36 and the pig 30 is typically pre-assembled, so that the apparatus can be speedily mounted on the length of pipeline 12 carrying the pig 30. Typically, the apparatus 28 will be assembled onshore and transported in an assembled state to an offshore location where it is required. However, for convenience, the apparatus 28 may be shipped as separate components and assembled offshore. In particular, the collar 44 and pig housing 54 may be provided as a unitary component, and the ramrod support 62, pipeline pig 30 and ramrod 38 provided separately. Either way, the drive arrangement including the cylinder/piston 74/76 will typically be pre-mounted to the flange 58 on the pig housing 54, excluding perhaps any required hydraulic connections for providing hydraulic power to operate the drive arrangement. Where the apparatus 28 is assembled offshore, this will typically be achieved by locating the pig 30 within the support 62, inserting the ramrod 38 through the aperture 68 of the support 62, and then securing the nose fixing 116 of the connection 102 in the end of the ramrod 38. The ramrod 38 will then be coupled to the pig 30, and the assembly comprising the ramrod 38, pig 30 and support 62 subsequently connected to the pig housing 54, by coupling the support flange 64 to the flange 58 on the pig housing.

As discussed above, the pig deployment device 36 is mounted on the severed end 40 of the length of pipeline 12 by locating the severed end in the collar 44. The collar 44 is restrained by tensioning arms or cables (not shown), which are coupled to padeyes 146 on the collar. This counteracts the forces imparted on the pig 30 by the ramrod 38 during insertion, to prevent the pig deployment device 36 from lifting off the severed end 40 of the pipeline 12. Following mounting of the collar 44 on the pipeline 12, and secure coupling of the ramrod 38 to the pig 30 (if required), the drive arrangement 72 can be operated to extend the piston 76, so that it can be secured to the joint 78, by means of the piston mounting 84 (if this has not already been carried out). The drive arrangement 72 can then be actuated to move the piston 76 from this starting position to a finishing position, which is shown in FIG. 2. This urges the joint 78 towards the flange 58 on the pig housing 54, thereby translating the ramrod 38, via its engagement with the joint collar 80. This serves to translate the pig 30 from its position within the support 62, into the pig loading chamber 56 defined by the housing 54.

The joint 78 is then released from the ramrod 38, by removing the locking pin which extends through the apertures 88 in the collar 80 and the respective pair of apertures 92 in the ramrod. The drive arrangement 72 is then actuated to extend the piston 76 relative to the cylinder 74 back towards its starting position, to move the joint 78 back towards the position shown in FIG. 2. The joint 78 can then be reconnected to the ramrod 38, in this case by passing the locking pin through the apertures 88 in the collar 80 and through the next pair of apertures 92a in the ramrod 38. The drive arrangement is then actuated to return the piston 76 to the finishing position (FIG. 2), thereby translating the ramrod 38 a further axial distance relative to the length of pipeline 12. This serves to translate the pig 30 from the pig loading chamber 58, through the collar 44 and into the pipeline 12, facilitated by the tapered portion 50 (which guides the pig into the collar and so into the severed end 40 of the length of pipeline 12).

The joint 78 is then released from the ramrod 38 again and the piston 76 translated to move the joint back to its starting position. The joint 78 is then re-secured to the ramrod 38, the locking pin passing through the next set of apertures 92 in the ramrod, in this case the apertures 92b. The drive arrangement 72 is then actuated again to translate the ramrod 38 a further axial distance relative to the length of pipeline 12. This serves to translate the pig 30 a further distance into the pipeline 12. This process is repeated in a number of sequential steps by securing the joint 78 to the ramrod 38 through the apertures 92c, 92d etc., until the pig has been translated a desired axial distance into the length of pipeline 12.

It will be appreciated that a volume of air is typically contained within the length of pipeline 12, between the severed end 40 and normal sea level 148 (the pipeline 12 having been flooded with water during deployment). In order to prevent this volume of air being trapped between the pig 30 and the water in the pipeline 12, it is necessary to provide a pathway for the passage of air past the pig 30 during insertion. To this end, an elongate breather element in the form of a breather rod 150 (FIG. 4) is positioned within the pig deployment device 36, prior to insertion of the pig 30 into the pig loading chamber 56. The breather rod 150 is typically of solid cross-section, but could alternatively be a hollow tube or pipe. Advantageously, the breather rod 150 is of a relatively low friction material, suitable materials including plastics, in particular PTFE. The breather rod 150 extends from the pig deployment device 36 into the length of pipeline 12, through the severed end 40, and cooperates with the wiping seal elements 132 and 136 on the pig 30 to provide a pathway for expulsion of air from the pipeline 12 past the pig 30 during insertion. To this end, the breather rod 150 is typically inserted into the water in the pipeline 12, so that complete expulsion of air can be achieved. Manufacturing the breather rod 150 of a low friction material facilitates removal of the rod following location of the pig 30 in the pipeline 12.

Once the pig 30 has been located in the desired position, the ramrod 38 can be released from the pig and retracted. This is achieved by releasing the joint 78 from the ramrod, and rotating the ramrod 38 through 90°, using a suitable torque tool. This disengages the locking prongs 104 from the apertures 110 in the pig mounting plates 112. The steps described above for insertion of the ramrod 38 can then be repeated in reverse to extract the ramrod. The pig deployment device 36 can then be released from the pipeline 12, by removing the restraints coupled to the padeyes 146, and lifting the collar 44 off the severed end 40 of the length of pipeline 12.

As will be understood by persons skilled in the art, the portions of pipeline either side of the buckled section 24 (which has been removed) are securely supported, and the severed ends can then be brought into abutment and welded together. Typically pipelaying will then recommence, with further pipeline deployed from the reel 16 as the vessel 10 advances. The length of pipeline 12 containing the pig 30 is deployed down on to the seabed 14 (or in a desired deployment position, e.g. a lazy wave), and normal pipe laying procedures completed. Contamination resulting from the severing process employed to remove the buckled section 24 is contained within the pipeline between the distal end 42 and the pig 30. The pig can then be translated along the pipeline to a pig catcher 152 provided in a laydown head 154 (FIG. 1) at a distal end 42 of the pipeline 12. In this way, the contaminants, which typically comprise metal cuttings, are swept along the pipeline by the pig to the pig catcher 152, where they can be flushed out. In a variation on this procedure, the pig may be urged along the length of pipeline 12 to the catcher 152 prior to deployment of the pipeline on to the seabed 14 (or into its deployed position).

The apparatus 28 shown in FIGS. 2 to 29 is typically employed with relatively large diameter pipelines, suitably of the order of 18" outer diameter. If required with such larger diameter pipelines, the drive arrangement 72 can be provided with a second hydraulic cylinder and piston arrangement 74a/76a, which is shown in broken outline in FIG. 4. In these circumstances, the joint 78 would comprise a further arm similar to the arm 82, but extending in an opposite direction, spaced 180° from the arm shown in the figures, for coupling to the second piston 76a. This may be required in larger diameter pipelines in order to prevent distortion of the ramrod 38, and so uneven frictional forces on the various elements carried by the pig 30.

Turning now to FIGS. 31 and 32, there are shown views of an apparatus in accordance with an alternative embodiment of the present invention, indicated generally by reference numeral 28', which correspond to the views of the apparatus 28 of FIGS. 2 and 3. Like components of the apparatus 28' with the apparatus 28 share the same reference numerals, with the addition of the suffix '. The apparatus 28' is of like construction and operation to the apparatus 28 of FIGS. 2 to 29, save that it has a use with smaller diameter pipeline, typically of the order of 12" outer diameter. The only significant difference between the apparatus 28' and the apparatus 28 is that a pig housing 54' is provided which includes an eccentric flange 58', which serves for mounting a drive arrangement comprising a single hydraulic cylinder 74' and piston 76'. The smaller diameter of the pipeline 12' in this case does not require the potential provision of more than one hydraulic cylinder and piston.

Various modifications may be made to the foregoing without departing from the spirit or scope of the present invention.

What is claimed is:

1. A method of repairing a length of pipeline which has experienced a wet buckle during deployment from a pipelaying vessel towards a seabed, the method comprising the steps of:

severing the pipeline at locations which are spaced apart on opposite sides of a buckle and removing the buckled section to leave spaced first and second severed ends;
locating a pipeline pig in a pig deployment device;
releasably coupling a pig insertion member of the pig deployment device to the pig;
releasably coupling the pig deployment device to one of the severed ends;
operating the pig deployment device to cause the pig insertion member to translate the pig out of the deployment device and into the pipeline through said severed end;
releasing the pig insertion member from the pig and retracting the pig insertion member, leaving the pig in place within the pipeline;
releasing the pig deployment device from said severed end;
welding the severed ends together; and then
applying fluid pressure to the pig to translate the pig along the pipeline towards an end of the pipeline which is located distally from the vessel, to remove contaminants within the pipeline resulting from the severing process.

2. A method as claimed in claim 1, in which:
the step of releasably coupling the pig deployment device to said severed end comprises releasably coupling the device to the severed end of the length of pipeline extending from the vessel into the water; and
the step of operating the pig deployment device comprises translating the pig to a location at which at least part of the pig is below a level of water contained within the pipeline.

3. A method as claimed in claim 2, in which the pig is arranged to provide a wiping seal with a wall of the pipeline, and in which the method comprises expelling air contained between the pig and the surface of water in the pipeline during insertion of the pig.

4. A method as claimed in claim 3, comprising inserting an elongate breather element into the pipeline adjacent the wall of the pipeline so that, when the pig is inserted into the pipeline, the breather element is located between the wall of the pipeline and the pig to provide a pathway for the passage of air past the pig.

5. A method as claimed in claim 4, comprising locating the elongate breather element so that it extends along the pipeline from the severed end and into the water in the pipeline.

6. A method as claimed in claim 1, comprising the further steps of:
deploying the repaired length of pipeline towards the seabed carrying the pig;
arranging the portion of pipeline carrying the pig in a desired deployed position; and then
performing the step of translating the pig along the pipeline.

7. A method as claimed in claim 1, comprising performing the step of translating the pig along the pipeline, and then:
deploying the repaired length of pipeline towards the seabed carrying the pig; and arranging the portion of pipeline carrying the pig in a desired deployed position.

8. A method as claimed in claim 1, in which the step of releasably coupling the pig deployment device to one of the severed ends comprises coupling an interface member of the pig deployment device to said end, the interface member being shaped to receive said end.

9. A method as claimed in claim 1, in which the step of operating the pig deployment device comprises operating a drive arrangement of the device to translate the pig insertion member relative to the pipeline and so insert the pig.

10. A method as claimed in claim 9, comprising the further steps of:
a) locating the drive arrangement in a starting position;
b) releasably coupling the drive arrangement to the pig insertion member;
c) operating the drive arrangement to move from its starting position towards a finishing position, during which movement the pig insertion member is translated a determined axial distance by the drive arrangement in a direction towards the pipeline;
d) releasing the drive arrangement from the pig insertion member; and
e) returning the drive arrangement to the starting position.

11. A method as claimed in claim 10, comprising repeating steps b) to e) as necessary in order to locate the pig at a desired position within the pipeline.

12. A method as claimed in claim 9, comprising releasably coupling the drive arrangement to the pig insertion member using a releasable joint, and releasably coupling the pig insertion member to the pig via a releasable connection.

13. Apparatus for use in repairing a pipeline which has experienced a wet buckle during deployment from a pipe-laying vessel towards a seabed, the pipeline having been severed at locations which are spaced apart on opposite sides of the buckle and the buckled section removed to leave spaced first and second severed ends, the apparatus comprising:
a pipeline pig; and
a pig deployment device for inserting the pig into the pipeline, the pig being located in the pig deployment device and the pig deployment device comprising:
a pig insertion member;
a releasable connection by which the pig insertion member is releasably coupled to the pig;
a drive arrangement which is operable to translate the pig insertion member relative to the pipeline and so insert the pig into the pipeline; and
a releasable joint by which the drive arrangement is releasably coupled to the pig insertion member;
in which:
the pig deployment device can be releasably coupled to one of the severed ends and the drive arrangement of the pig deployment device operated to cause the pig insertion member to translate the pig out of the deployment device and into the pipeline through said severed end; and
the releasable connection facilitates subsequent release of the pig insertion member from the pig, so that the pig insertion member can be retracted leaving the pig in place within the pipeline, and the pig deployment device released from said severed end;
so that the severed ends can be welded together and fluid pressure applied to the pig to translate the pig along the pipeline towards an end of the pipeline which is located distally from the vessel, to remove contaminants within the pipeline resulting from the severing process.

14. Apparatus as claimed in claim 13, in which the pig deployment device comprises a housing defining a pig loading chamber, the pig being translatable from the pig loading chamber into the pipeline.

15. Apparatus as claimed in claim 14, in which the housing has a bore defining the pig loading chamber, the bore being of a diameter which is greater than a maximum external diameter of the pig.

16. Apparatus as claimed in claim 14, in which the pig deployment device comprises an interface member which can be coupled to one of the severed ends, and in which the housing is coupled to the interface member.

17. Apparatus as claimed in claim 16, in which the interface member has a portion which is couplable to said end of the pipeline, and which has a diameter matching an inner diameter of the pipeline.

18. Apparatus as claimed in claim 17, in which the interface member has a tapered portion which provides a transition from a diameter of the housing bore to the diameter of the portion which is couplable to said end of the pipeline.

19. Apparatus as claimed in claim 16, in which the interface member defines an abutment surface against which said end of the pipeline can be seated so that the pig deployment device is supported on said end of the pipeline.

20. Apparatus as claimed in claim 13, in which the drive arrangement is hydraulically operated, comprising at least one piston/cylinder device for controlling movement of the pig insertion member.

21. Apparatus as claimed in claim 20, in which a piston of the drive arrangement is releasably couplable to the pig insertion member via a connection element.

22. Apparatus as claimed in claim 21, in which the pig insertion member comprises a plurality of apertures through which a locating pin of the connecting element can be inserted to couple the drive arrangement to the pig insertion member.

23. Apparatus as claimed in claim 13, in which the releasable connection comprises a bayonet-type fitting having one or more locating pins provided on one of the pig and the pig insertion member, and which mate with a corresponding one or more locating aperture in the other one of the pig and the pig insertion member.

24. Apparatus as claimed in claim 23, in which the pins and apertures are engaged and disengaged by relative rotary motion between the pig insertion member and the pig.

25. A pipeline pig deployment device comprising:
a housing defining a pig loading chamber of a first diameter;
an interface member coupled to the housing, the interface member adapted to be mounted on an end of a length of pipeline and defining a bore of a second diameter which is smaller than said first diameter and which matches a diameter of a bore of the pipeline;
a pig insertion member;
a releasable connection for releasably coupling the pig insertion member to a pipeline pig;
a drive arrangement for the pig; and
a releasable joint by which the drive arrangement is releasable coupled to the pig insertion member;
in which the drive arrangement of the pig deployment device is operable to translate the pig insertion member relative to the pipeline, to cause the pig insertion member to translate the pig out of the pig loading chamber, through the interface member and into the pipeline through said severed end;
and in which the releasable connection facilitates release of the pig insertion member from the pig so that the pig insertion member can be subsequently retracted leaving the pig in place within the pipeline.

26. A method of repairing a length of pipeline which has experienced a wet buckle during deployment from a pipelaying vessel towards a seabed, the method comprising the steps of:
severing the pipeline at locations which are spaced apart on opposite sides of a buckle and removing the buckled section to leave spaced first and second severed ends, one of said ends being provided on a portion of the pipeline extending from the vessel into the water;
locating a pipeline pig in a pig deployment device;
releasably coupling a pig insertion member of the pig deployment device to the pig;
releasably coupling the pig deployment device to the one of the first and second severed ends provided on the portion of the pipeline extending from the vessel into the water;
operating the pig deployment device to cause the pig insertion member to translate the pig out of the deployment device and into the pipeline through said severed end to a location at which at least part of the pig is below a level of water contained within the pipeline;
arranging the pig so that it provides a wiping seal with a wall of the pipeline and expelling air contained between the pig and the surface of water in the pipeline during insertion of the pig;
releasing the pig insertion member from the pig and retracting the pig insertion member, leaving the pig in place within the pipeline;
releasing the pig deployment device from said severed end;
welding the severed ends together; and then
applying fluid pressure to the pig to translate the pig along the pipeline towards an end of the pipeline which is located distally from the vessel, to remove contaminants within the pipeline resulting from the severing process.

27. A method of repairing a length of pipeline which has experienced a wet buckle during deployment from a pipelaying vessel towards a seabed, the method comprising the steps of:
severing the pipeline at locations which are spaced apart on opposite sides of a buckle and removing the buckled section to leave spaced first and second severed ends;
locating a pipeline pig in a pig deployment device;
releasably coupling a pig insertion member of the pig deployment device to the pig;
releasably coupling the pig deployment device to one of the severed ends;
operating a drive arrangement of the pig deployment device to translate the pig insertion member relative to the pipeline, thereby translating the pig out of the deployment device and into the pipeline through said severed end, in which the step of operating the drive arrangement comprises:
a) locating the drive arrangement in a starting position;
b) releasably coupling the drive arrangement to the pig insertion member;
c) operating the drive arrangement to move from its starting position towards a finishing position, during which movement the pig insertion member is translated a determined axial distance by the drive arrangement in a direction towards the pipeline;
d) releasing the drive arrangement from the pig insertion member; and
e) returning the drive arrangement to the starting position;
releasing the pig insertion member from the pig and retracting the pig insertion member, leaving the pig in place within the pipeline;
releasing the pig deployment device from said severed end;
welding the severed ends together; and then
applying fluid pressure to the pig to translate the pig along the pipeline towards an end of the pipeline which is located distally from the vessel, to remove contaminants within the pipeline resulting from the severing process.

28. A method of repairing a length of pipeline which has experienced a wet buckle during deployment from a pipelaying vessel towards a seabed, the method comprising the steps of:
severing the pipeline at locations which are spaced apart on opposite sides of a buckle and removing the buckled section to leave spaced first and second severed ends;
locating a pipeline pig in a pig deployment device;
releasably coupling a pig insertion member of the pig deployment device to the pig via a releasable connection;
releasably coupling the pig deployment device to one of the severed ends;

releasably coupling a drive arrangement of the pig deployment device to the pig insertion member using a releasable joint;

operating the drive arrangement of the pig deployment device to cause the pig insertion member to translate the pig out of the deployment device and into the pipeline through said severed end;

releasing the pig insertion member from the pig and retracting the pig insertion member, leaving the pig in place within the pipeline;

releasing the pig deployment device from said severed end;

welding the severed ends together; and then applying fluid pressure to the pig to translate the pig along the pipeline towards an end of the pipeline which is located distally from the vessel, to remove contaminants within the pipeline resulting from the severing process.

29. Apparatus for use in repairing a pipeline which has experienced a wet buckle during deployment from a pipe-laying vessel towards a seabed, the pipeline having been severed at locations which are spaced apart on opposite sides of the buckle and the buckled section removed to leave spaced first and second severed ends, the apparatus comprising:

a pipeline pig; and a pig deployment device for inserting the pig into the pipeline, the pig being located in the pig deployment device and the pig deployment device comprising:

a pig insertion member which is releasably coupled to the pig;

a drive arrangement for translating the pig relative to the pipeline, the drive arrangement being hydraulically operated and comprising at least one piston/cylinder device for controlling movement of the pig insertion member;

in which:

the pig deployment device can be releasably coupled to one of the severed ends and the drive arrangement of the pig deployment device operated to cause the pig insertion member to translate the pig out of the deployment device and into the pipeline through said severed end; and the pig insertion member can subsequently be released from the pig and retracted leaving the pig in place within the pipeline, and the pig deployment device released from said severed end;

so that the severed ends can be welded together and fluid pressure applied to the pig to translate the pig along the pipeline towards an end of the pipeline which is located distally from the vessel, to remove contaminants within the pipeline resulting from the severing process.

30. Apparatus for use in repairing a pipeline which has experienced a wet buckle during deployment from a pipe-laying vessel towards a seabed, the pipeline having been severed at locations which are spaced apart on opposite sides of the buckle and the buckled section removed to leave spaced first and second severed ends, the apparatus comprising:

a pipeline pig; and a pig deployment device for inserting the pig into the pipeline, the pig being located in the pig deployment device and the pig deployment device comprising a pig insertion member which is releasably coupled to the pig via a releasable connection, the releasable connection comprising a bayonet-type fitting having one or more locating pins provided on one of the pig and the pig insertion member, and which mate with a corresponding one or more locating aperture in the other one of the pig and the pig insertion member;

in which:

the pig deployment device can be releasably coupled to one of the severed ends and the pig deployment device operated to cause the pig insertion member to translate the pig out of the deployment device and into the pipeline through said severed end; and the pig insertion member can subsequently be released from the pig and retracted leaving the pig in place within the pipeline, and the pig deployment device released from said severed end;

so that the severed ends can be welded together and fluid pressure applied to the pig to translate the pig along the pipeline towards an end of the pipeline which is located distally from the vessel, to remove contaminants within the pipeline resulting from the severing process.

* * * * *